H. D'OLIER, Jr.
LIGHT DISTRIBUTION CHART.
APPLICATION FILED AUG. 14, 1916.
1,272,021.
Patented July 9, 1918.
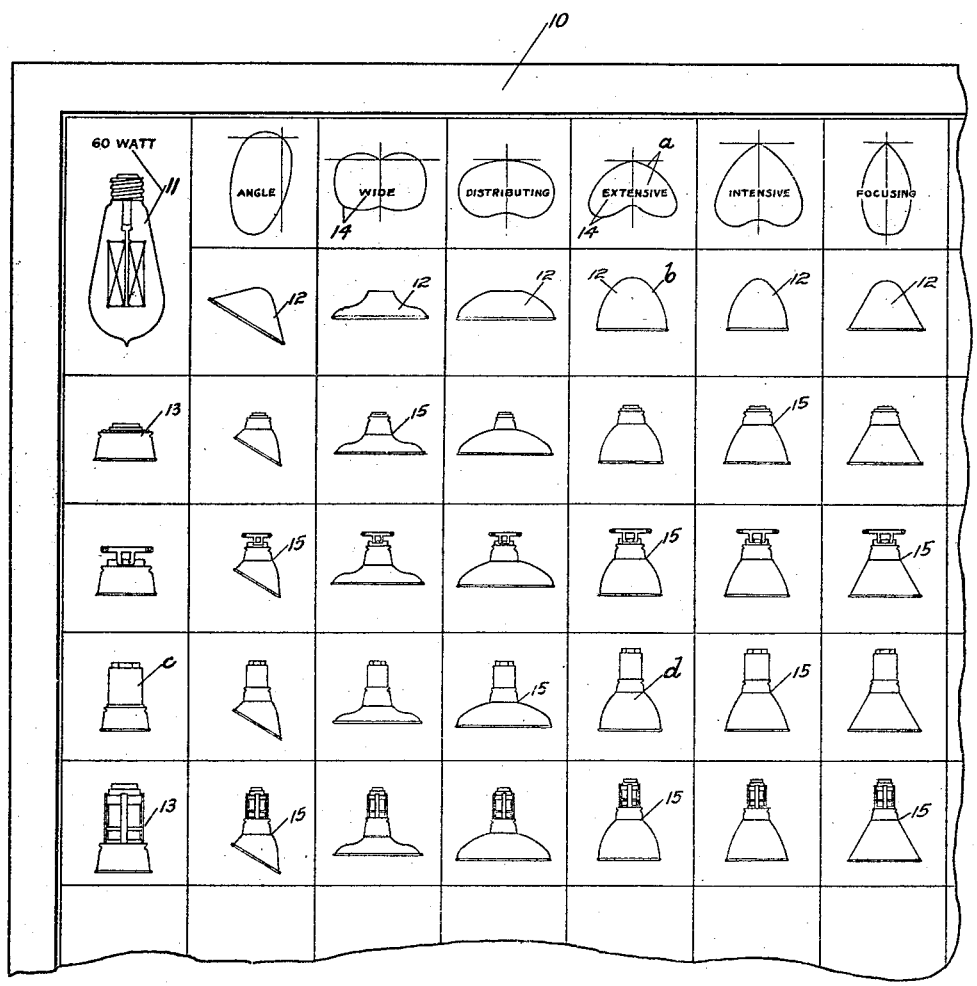
WITNESS
INVENTOR
BY
ATTORNEY

UNITED STATES PATENT OFFICE.

HENRY D'OLIER, JR., OF BRIDGEPORT, CONNECTICUT, ASSIGNOR TO HARVEY HUBBELL, INCORPORATED, OF BRIDGEPORT, CONNECTICUT, A CORPORATION OF CONNECTICUT.

LIGHT-DISTRIBUTION CHART.

1,272,021.     Specification of Letters Patent.     Patented July 9, 1918.

Application filed August 14, 1916. Serial No. 114,673.

*To all whom it may concern:*

Be it known that I, HENRY D'OLIER, Jr., a citizen of the United States, residing at Bridgeport, county of Fairfield, State of Connecticut, have invented an Improvement in Light-Distribution Charts, (Case B,) of which the following is a specification.

This invention has for its object to provide a light distribution chart, which shall display, in connection with a representation of lamp wattage, a set of representations of holders and a set of representations of reflectors, a set of representations of results obtainable, i. e., indications of different degrees of light concentration and direction, said representations being so arranged as to display, at the intersection of imaginary lines extending through a representation of a holder and through representations of a result and of a reflector, a representation of a unit combining a holder and a reflector that will produce, with the lamp wattage indicated, the concentration of light indicated by the selected representation of a result. In other words, my novel chart enables the user to select at a glance the proper reflector and holder to produce, when combined with the lamp, the required concentration and direction of the rays of light.

With the above and other objects in view, I have devised the novel light distribution chart of which the following description in connection with the accompanying drawing is a specification, reference characters being used to indicate the several parts.

The drawing is a plan view of a portion of a light distribution chart embodying my novel invention.

10 denotes a card, sheet or folder which for convenience I will term the sheet, and which may be made of any suitable material, as of celluloid, paper or textile material, and of any preferred shape, as round or angular. By preference, although not necessarily, the sheet is divided, by lines crossing each other at right angles, into squares. I will describe the chart illustrated in the drawing, although it should be understood that the special arrangement of the representations is not essential. 11 denotes a representation of lamp wattage, which may be in the form of a picture of a lamp or of a statement of the wattage of a lamp, as for example "60 watt," or both picture and statement may be used, if preferred, as shown in the drawing. 12 denotes a set of representations of reflectors, 13 a set of representations of holders therefor, and 14 a set of representations of results obtainable in the concentration and direction of rays of light. These representations may be in the form of diagrams indicating different degrees of light concentration, or of words indicating different degrees of light concentration, as "Angle," "Wide," "Distributing," "Extensive," "Intensive," "Focusing," &c., or both diagrams and words may be used if preferred, as shown in the drawing. 15 denotes a set of representations of units consisting of combined reflectors and holders used to produce the different degrees of light concentration indicated. In the arrangement shown, the representation of lamp wattage is placed at the upper left hand corner and the representations of holders in a vertical column in alinement with the representation of lamp wattage. The representations of results obtainable are shown as placed in a horizontal line and the representations of reflectors in another horizontal line in vertical alinement with the representations of results, the representations of units comprising combinations of reflectors and holders occupying the rest of the sheet. These units are so arranged that the unit at the intersection of imaginary lines extending through a holder and through a representation of a result and of a reflector represents a combination of the special holder and reflector through which the imaginary lines are drawn, and will produce the degree of light concentration and direction indicated by the representation of a result through which an imaginary line is drawn. For example, suppose that it is desired to produce, with the lamp wattage illustrated, the degree of light concentration indicated by the representation of a result specifically marked $a$, in connection with the reflector specifically indicated by $b$ and the holder specifically indicated by $c$; the unit specifically indicated by $d$, which is required to produce the selected result, will be displayed at the intersection of the imaginary lines above described.

Having thus described my invention, I claim:—

1. A chart of the character described, comprising a set of indications of different degrees of light concentration obtainable from a source of light of given intensity, coupled with a set of indications of devices capable of producing the said different degrees of light concentration, and a set of different fixture indications so disposed with respect to the set of indications of light concentration that the required combination of fixtures to produce the desired light concentration will be located at the intersection of an imaginary line extending from any one indication of light concentration, with one extending from any one indication of a fixture and at right angles with respect to the first line.

2. A chart of the character decribed comprising indications of a lamp of given light intensity, a set of indications of different light concentrations and of reflectors capable of producing such light concentrations, said set of indications of light concentration and indications of reflectors being in parallel lines and in line with the lamp, the character of reflector capable of giving a fixed light concentration being opposite the indications of that concentration, and a set of different fixture indications so disposed with respect to the set of indications of light concentration that the required combination of fixtures to produce the desired light concentration will be located at the intersection of an imaginary line extending from any one indication of light concentration, with one extending from any one indication of a fixture and at right angles with respect to the first line.

In testimony whereof I affix my signature.

HENRY D'OLIER, Jr.